United States Patent
Chen

(10) Patent No.: US 10,028,360 B1
(45) Date of Patent: Jul. 17, 2018

(54) SELECTIVE CONTROL OF DECORATIVE LIGHTING WITH CONTROL OPTION INDICATION

(71) Applicant: Willis Electric Co., Ltd., Taipei (TW)

(72) Inventor: Johnny Chen, Taipei (TW)

(73) Assignee: Willis Electric Co., Ltd., Taipei (TW)

( * ) Notice: Subject to any disclaimer, the term of this patent is extended or adjusted under 35 U.S.C. 154(b) by 0 days.

(21) Appl. No.: 15/281,788

(22) Filed: Sep. 30, 2016

Related U.S. Application Data

(60) Provisional application No. 62/294,464, filed on Feb. 12, 2016.

(51) Int. Cl.
*F21S 6/00* (2006.01)
*H05B 37/02* (2006.01)
(Continued)

(52) U.S. Cl.
CPC ......... *H05B 37/0281* (2013.01); *A47G 33/06* (2013.01); *A47G 33/08* (2013.01); *F21S 4/10* (2016.01); *F21V 23/00* (2013.01); *F21V 23/001* (2013.01); *F21V 23/003* (2013.01); *F21V 23/06* (2013.01); *F21V 31/00* (2013.01); *F21V 33/0028* (2013.01); *H05B 33/0845* (2013.01);
(Continued)

(58) Field of Classification Search
CPC ......... F21W 2121/00; F21W 2121/002; F21W 2121/006; F21W 2121/004; F21W 2121/008; F21W 2121/02; F21W 2121/06; F21W 2121/04; F21S 4/10; A47G 33/06; A47G 33/08
USPC ....................................................... 362/123
See application file for complete search history.

(56) References Cited

U.S. PATENT DOCUMENTS 1,590,220 A 6/1926 Wurts
5,376,752 A 12/1994 Limeris et al.
(Continued)

FOREIGN PATENT DOCUMENTS

WO WO 02/075862 9/2002

OTHER PUBLICATIONS

DeversDreamWeavers, "Gangnam Style Christmas", Dec. 25, 2012, Youtube, http://www.youtube.com/watch?v=_2e1w3gPkms.*
(Continued)

*Primary Examiner* — Bao Q Truong
*Assistant Examiner* — Matthew Peerce
(74) *Attorney, Agent, or Firm* — Christensen, Fonder, Dardi & Herbert PLLC

(57) ABSTRACT

A selectively controlled lighted artificial tree with visual timing function indication, comprising: a tree trunk having a plurality of branches; a plurality of lighting assemblies including light elements, the plurality of lighting assemblies distributed about the plurality of branches; a plurality of wires in electrical connection with the plurality of light elements, the plurality of wires for transmitting electrical power to the plurality of light elements; a controller in electrical communication with the plurality of lighting assemblies, the controller including a push-button switch and a logic-control circuit with a processor, the controller configured to selectively cause power to be transmitted to one or more of the plurality of light elements for a power-on duration, and to cause one or more of the plurality of light elements to selectively be powered on and off to provide a visual indication of the power-on duration.

20 Claims, 11 Drawing Sheets

(51) Int. Cl.
*F21V 23/00* (2015.01)
*F21V 31/00* (2006.01)
*F21V 33/00* (2006.01)
*F21S 4/10* (2016.01)
*H05B 33/08* (2006.01)
*F21V 23/06* (2006.01)
*A47G 33/06* (2006.01)
*A47G 33/08* (2006.01)
*F21W 121/04* (2006.01)
*F21Y 113/13* (2016.01)
*F21Y 115/10* (2016.01)

(52) U.S. Cl.
CPC . *A47G 2033/0827* (2013.01); *F21W 2121/04* (2013.01); *F21Y 2113/13* (2016.08); *F21Y 2115/10* (2016.08)

(56) References Cited

U.S. PATENT DOCUMENTS

| | | | |
|---|---|---|---|
| 5,438,154 A | 8/1995 | Segan et al. | |
| 5,629,587 A | 5/1997 | Gray et al. | |
| 5,639,157 A | 6/1997 | Yeh | |
| 5,828,183 A | 10/1998 | Wang et al. | |
| 5,852,348 A | 12/1998 | Lin | |
| 5,854,541 A | 12/1998 | Chou | |
| 5,860,731 A | 1/1999 | Martinez | |
| 6,091,204 A | 7/2000 | Chen | |
| 6,217,199 B1* | 4/2001 | Lo | F21S 6/007 362/276 |
| 6,533,437 B1 | 3/2003 | Ahroni | |
| 6,794,825 B1 | 9/2004 | Kao | |
| 6,908,215 B2 | 6/2005 | Wu | |
| 8,454,186 B2 | 6/2013 | Chen | |
| 8,454,187 B2 | 6/2013 | Chen | |
| 8,863,416 B2 | 10/2014 | Leung et al. | |
| 8,959,810 B1 | 2/2015 | Leung et al. | |
| 9,119,495 B2 | 9/2015 | Leung et al. | |
| 2003/0121781 A1 | 7/2003 | Prohaska et al. | |
| 2003/0231779 A1 | 12/2003 | Billington | |
| 2006/0158138 A1* | 7/2006 | Walter | A47G 19/025 315/316 |
| 2009/0003012 A1* | 1/2009 | Hsu | G02B 6/0006 362/567 |
| 2012/0098465 A1* | 4/2012 | Rothschild | H05B 37/02 315/360 |
| 2016/0178172 A1* | 6/2016 | Boyink | F21V 23/003 362/123 |

OTHER PUBLICATIONS

Holtek "HT2040A Christmas Light Controller" (Mar. 26, 1997) 9 pgs.

Mosdesign Semiconductor Corp. "8 Functions Xmas Light Control" (May 14, 2002) 2 pages.

* cited by examiner

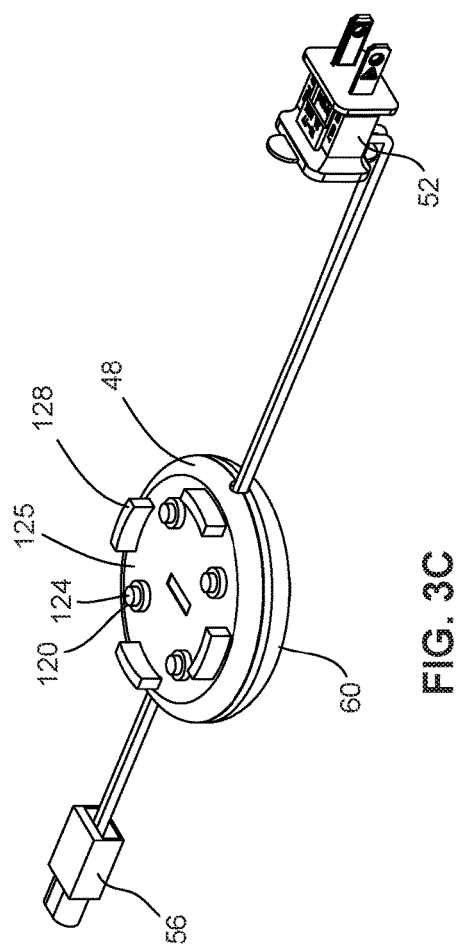
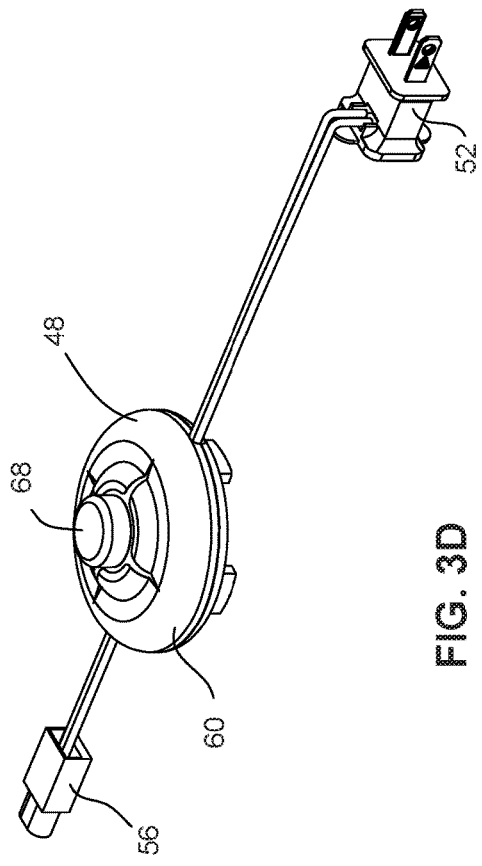
FIG. 3C
FIG. 3D

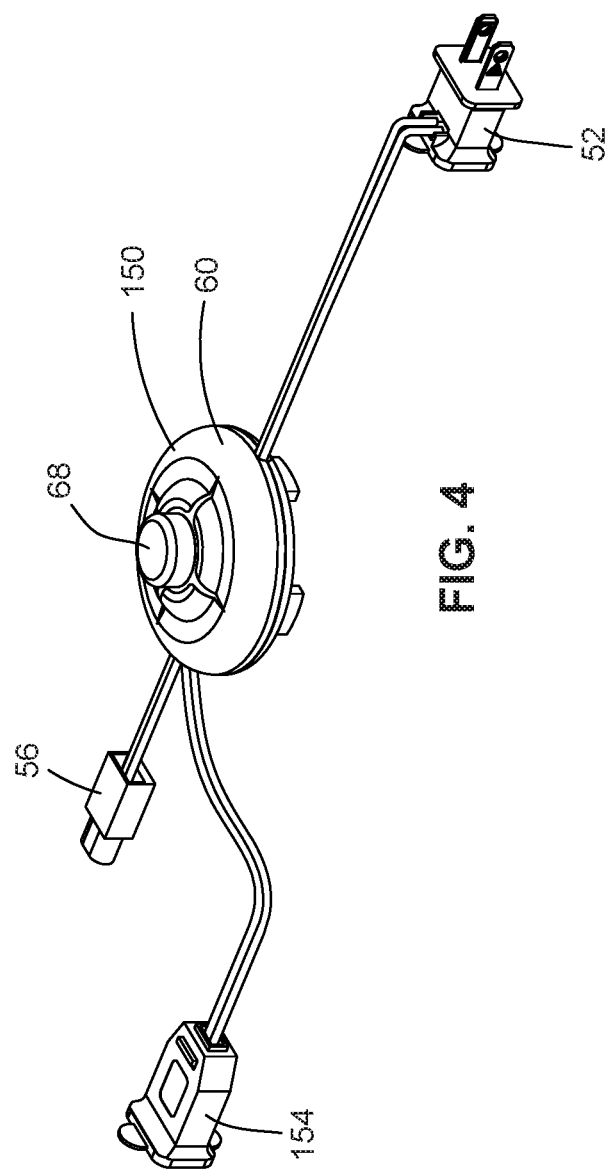

SELECTIVE CONTROL OF DECORATIVE LIGHTING WITH CONTROL OPTION INDICATION

CROSS-REFERENCE TO RELATED APPLICATIONS

The present application claims the benefit of U.S. Provisional Patent Application No. 62/294,464, filed Feb. 12, 2016, which is hereby incorporated by reference herein in its entirety.

FIELD OF THE DISCLOSURE

The present disclosure relates to control of decorative lighting, including control of decorative lighting on lighted artificial trees. More specifically, the present disclosure relates to methods, devices and systems for selectively controlling powering of decorative lighting and providing indicators of control options to a user.

BACKGROUND

For the sake of convenience and safety, consumers often substitute artificial trees, constructed of metal and plastic, for natural trees when decorating homes, offices, and other spaces, especially during the holidays. Such artificial trees generally include multiple tree sections joined at the trunk and held erect by a floor-based tree stand. Traditionally, consumers wrap strings of lights about the artificial tree, or lights are included as a part of a tree to enhance the decorative quality of the tree display.

Light strings on the tree may include simple light strings with single-color lamps meant to be powered on or off. Other light strings on trees may be more sophisticated, and configured to be selectively controlled to produce light displays, such as flashing lights, color-changing lights, twinkling lights, chasing lights, and so on. Power to light strings may also be selectively controlled by a timer device that controls powering of the light strings for predetermined amounts of time during a 24-hour period.

However, known devices for selectively controlling light strings, particularly those on a lighted artificial tree, are not always particularly user friendly. For example, to select a particular light display or pattern, a user must cycle through various patterns, waiting at each selection to see enough of the display or pattern to discern what it is, e.g., slow color changing from red to green to blue, which takes time. For devices controlling the amount of time that the decorative timer will be powered on, a user typically must pick up the device or a portion thereof, and view indicia on a housing or box corresponding to a switch.

SUMMARY

Embodiments of the disclosure address the shortcomings of known devices for selectively controlling decorative lighting products by providing devices, methods and systems for not only selectively controlling such products, but by also providing visual or audible indicators to a user corresponding to the various control options available. In an embodiment, visual indicators may be accomplished by selectively powering lights in a pattern corresponding to a control option, such as, for example, flashing red lights several times to indicate that the control option is for red lights, or flashing clear lights three times to indicate that the lights will be powered on for a period of three hours. As will be described further below, such indication may be accomplished by control of indicator lights integrated into a control device or may be accomplished by control of the lights or lamps of the decorative lighting product to be controlled, such as a light string on a tree.

Aspects of the disclosure are directed to an artificial tree including a trunk portion, a plurality of branch assemblies coupled to the trunk portion, and one or more lighting assemblies distributed in the artificial tree. In one or more embodiments, the artificial tree additionally includes a lighting controller for configuration of the one or more lighting assemblies. In various embodiments, the lighting controller includes a housing portion that houses an array of one or more indicator lighting elements, such as LEDs. In certain embodiments, the housing portion additionally includes a switch or pedal mounted in the housing.

In certain embodiments, the lighting controller includes control logic that coupled with the switch or pedal and with the one or more lighting assemblies for configuring the operation of the lighting assemblies. For example, in certain embodiments, the control logic configures the lighting assemblies to perform various lighting functions, control color, operate according to various timing functions, control brightness settings, and other various settings.

In certain embodiments, the control logic is additionally coupled with the one or more lighting elements of the housing to indicate, using the one or more lighting elements, the configuration of the lighting assemblies. For example, in certain embodiments, the control logic, using the lighting elements, displays various visual indicators that are associated with various functions and/or settings for the lighting assemblies.

Accordingly, one or more embodiments of the disclosure provide an improved artificial tree with improved configurability. For example, one or more embodiments allow for relatively quick cycle through of various settings configurations for the tree, such as timer settings, light settings, color settings, and the like with quick confirmation of the various settings via indicator lighting elements. In an embodiment, the indicator lighting elements are in the controller housing. In other embodiments, the indicator lighting elements are part of, or the same as, the lighting assemblies that are being controlled. Additionally, one or more embodiments of the disclosure allow for relatively easy change of settings which may not be readily apparent. For example, timer settings, or other settings which may, in some instances, take a significant amount of time to observe and confirm. Thus, embodiments of the disclosure allow a user to set or change the function of the lighting assemblies and quickly confirm the settings using the lighting elements in the controller housing.

Another embodiment comprises a selectively controlled lighted artificial tree with visual timing function indication, comprising: a tree trunk having a plurality of branches; a plurality of lighting assemblies including light elements, the plurality of lighting assemblies distributed about the plurality of branches; a plurality of wires in electrical connection with the plurality of light elements, the plurality of wires for transmitting electrical power to the plurality of light elements; a controller in electrical communication with the plurality of lighting assemblies, the controller including a push-button switch and a logic-control circuit with a processor, the controller configured to selectively cause power to be transmitted to one or more of the plurality of light elements for a power-on duration, and to selectively cause power not to be transmitted to the one or more of the plurality of light elements for a power-off duration, and to cause one or more of the plurality of light elements to selectively be powered on for an indication duration, then powered off, wherein a number of times that the one or more of the plurality of light elements is selectively powered on for an indication duration corresponds to the power-on duration, thereby visually indicating a power-on duration.

Another embodiment comprise a controller system for an artificial lighted tree having a plurality of light elements, comprising: a controller housing; a power cord having a power plug at a first end, the power plug configured to be plugged into an external power source, the power cord connected at a second end to the housing; a timer controller circuit enclosed by the housing and including a processor; a plurality of output wires in electrical connection with the timer controller circuit; a push-button switch coupled to the housing and in communication with the processor of the timer controller circuit, wherein the timer controller circuit is configured to selectively cause power to be transmitted to the plurality of output wires in response to actuation of the push-button switch for a power-on duration, and to cause one or more indicator light elements to selectively be powered on for an indication duration, then powered off, wherein a number of times that the one or more light elements is selectively powered on for an indication duration corresponds to the power-on duration, thereby visually indicating a power-on duration.

Another embodiment comprises a selectively controlled lighted artificial tree with visual timing function indication, comprising: a tree trunk having a plurality of branches; a plurality of lighting assemblies including light elements, the plurality of lighting assemblies distributed about the plurality of branches; a plurality of wires in electrical connection with the plurality of light elements, the plurality of wires for transmitting electrical power to the plurality of light elements; a controller in electrical communication with the plurality of lighting assemblies, the controller including a push-button switch and a logic-control circuit with a processor, the controller configured to selectively cause power to be transmitted to one or more of the plurality of light elements for a power-on duration, and to cause one or more of the plurality of light elements to selectively be powered on and off to provide a visual indication of the power-on duration.

Another embodiment comprises a selectively controlled lighted artificial tree with visual timing function indication, comprising: a tree trunk having a plurality of branches; a plurality of lighting assemblies including light elements, the plurality of lighting assemblies distributed about the plurality of branches; a plurality of wires in electrical connection with the plurality of light elements, the plurality of wires for transmitting electrical power to the plurality of light elements; one or more indicator lights; a controller in electrical communication with the plurality of lighting assemblies, the controller including a push-button switch and a logic-control circuit with a processor, the controller configured to selectively cause power to be transmitted to one or more of the plurality of light elements for a power-on duration, and to cause at least one of the one or more indicator lights to selectively be powered on and off to provide a visual indication of the power-on duration.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 3A-3D depicts a lighting control module, according to one or more embodiments of the disclosure.

FIG. 4 depicts a perspective view of a lighting control module, according to one or more embodiments of the disclosure.

Figure 1:
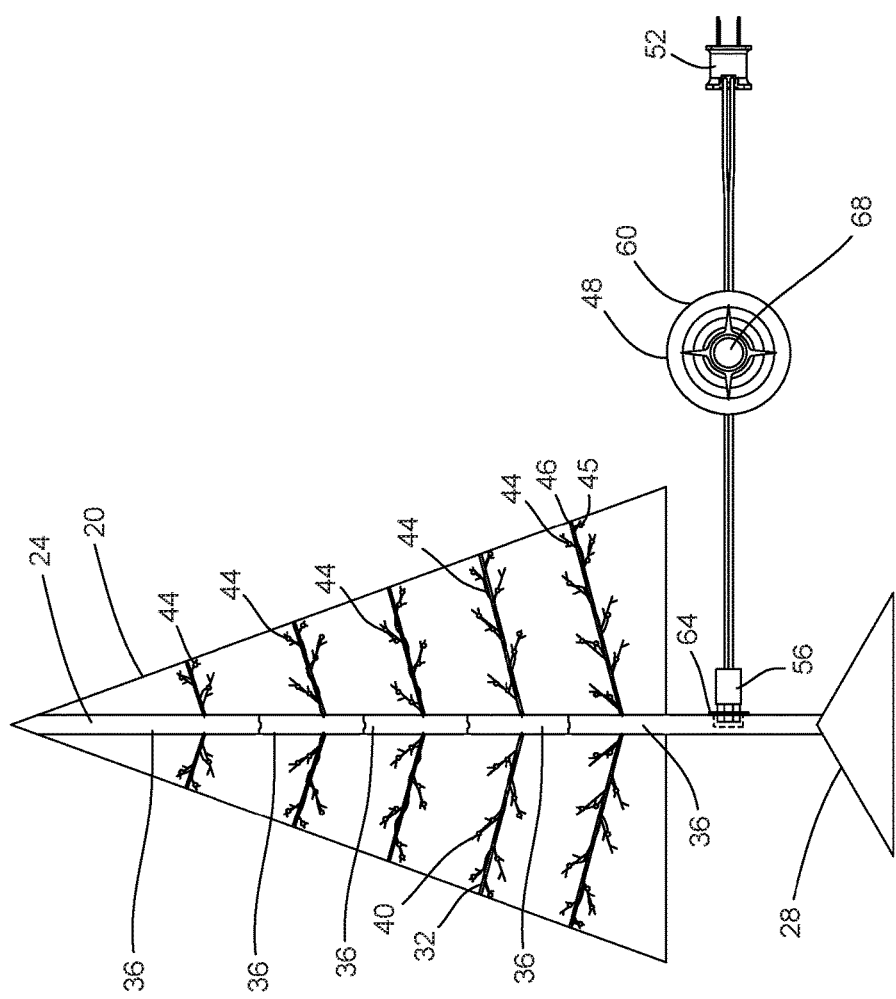
FIG. 1 depicts an artificial tree with a lighting control module, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIG. 1, an artificial tree 20 is depicted, according to one or more embodiments of the disclosure. The artificial tree 20 includes a trunk portion 24 a base portion 28 for receiving the trunk portion 24, and a plurality of branch assemblies 32 coupled to the trunk portion 24. In one or more embodiments, the trunk portion 24 is segmented into one or more sub-portions 36 that, during assembly of the artificial tree 20, are coupled to one or more adjacent sub-portions 36 to form the trunk portion 24. In various embodiments, each of the sub-portions 36 include one or more of the branch assemblies 32. The branch assemblies 32 may be coupled to each of the sub-portions 36 and configured to extend outwardly from the various sub-portions 36 to simulate the appearance of a tree branch. Additionally, in some embodiments, each of the branch assemblies 32 includes a plurality of outwardly extending sub-branches 40 including artificial foliage for simulating the look and/or feel of a real tree.

In various embodiments, the artificial tree 20 includes one or more lighting assemblies 44 distributed in various locations in the artificial tree 20. For example, depicted in FIG. 1, one or more lighting assemblies 44 are located on the one or more branch assemblies 32 and/or sub-branches 40. The one or more lighting assemblies 44 each include a plurality of lighting elements 45 connected together via a wiring assembly 46.

In one or more embodiments, the artificial tree 20 includes a lighting controller 48 for control of the one or more lighting assemblies 44. The lighting controller 48 may include a power connector 52, an artificial tree connector 56, and a controller housing portion 60. In various embodiments, the lighting controller 48 is connectable to the artificial tree 20 via the artificial tree connector 56 and a corresponding controller connector 64 in the trunk portion 24. Similarly, the power connector 52 is connectable to a power source, such as via a wall outlet connected to building power, or other suitable power source, to supply power through the lighting controller 48 and to the trunk portion 24 and to its lighting assemblies 44. In certain embodiments, the lighting controller 48 is configurable to operate using a DC power source, such as a 12 VDC power source, or an AC power source. For example, in some embodiments, the lighting controller 48 includes an adaptor or transformer for converting AC power to DC power, thereby providing DC power for operation of the lighting controller and the one or more lighting assemblies 44. In some embodiments, the adapter may be integral to lighting controller 48, or may be separate from controller 48. Any combination of AC and/or DC power may be used to operate tree 20, including controller 48 and lighting assemblies 48.

As such, in various embodiments the lighting controller 48 provides power to the artificial tree 20 and the one or more lighting assemblies 44. In one or more embodiments, the controller housing portion 60 is generally water proof, protecting electronic components in the housing from damage due to outside elements and allowing for usage outside.

Described further, in various embodiments, the controller housing 60 includes lighting control logic for configuration of various lighting settings and/or control over the one or more lighting assemblies 44. In some embodiments, the lighting control logic implements various lighting and/or timing functions in the one or more lighting assemblies 44. For example, the lighting control logic can implement functions such as twinkling (selectively powering some lamps on and off), color changing, flashing, brightness settings, and various timer settings. In one or more embodiments, the controller housing 60 includes a manual switch 68 for receiving logical inputs from a user to control the lighting control logic.

Figure 2:
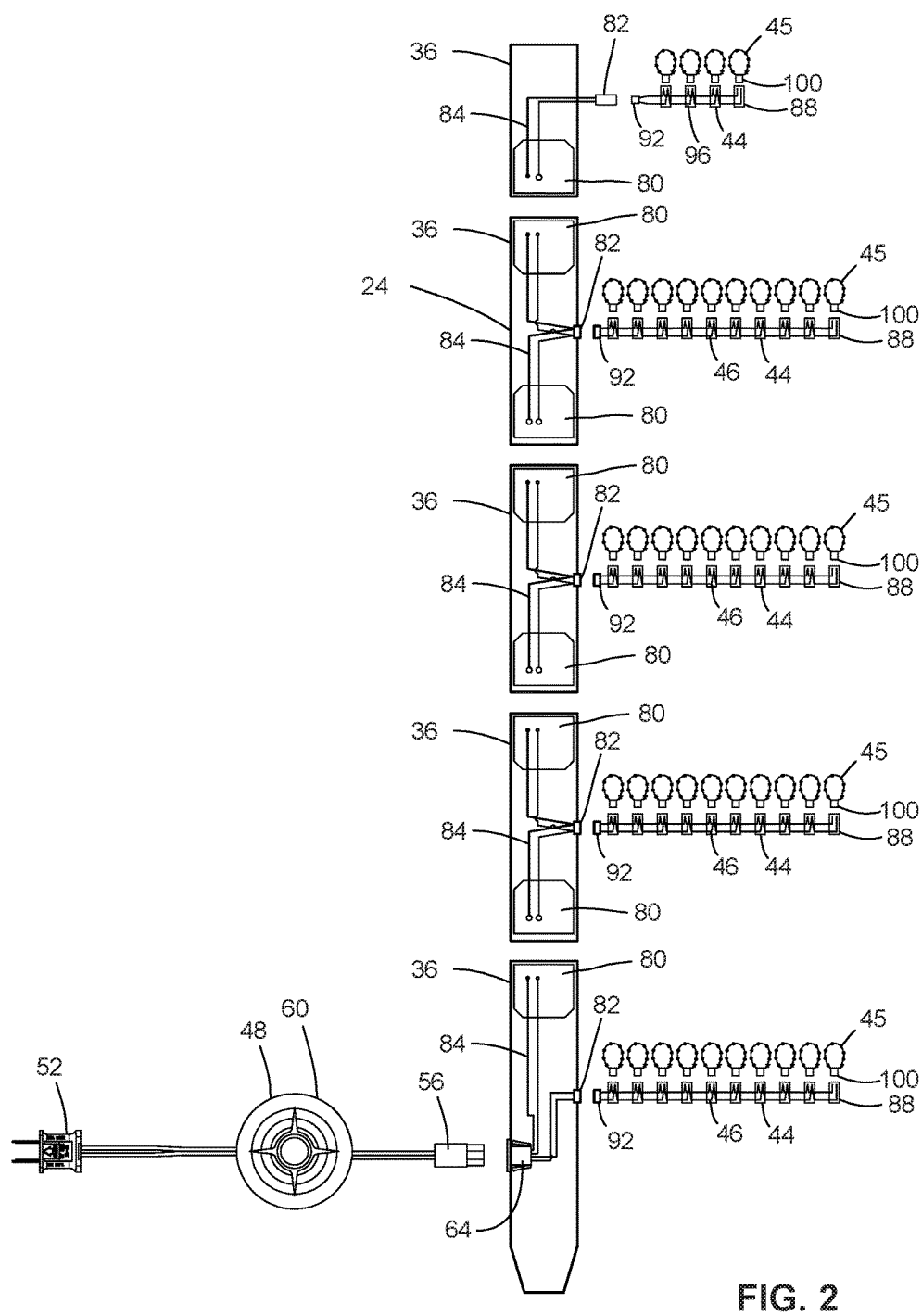
FIG. 2 depicts a system view of a trunk portion of an artificial tree, with a plurality of lighting assemblies and a lighting control module, according to one or more embodiments of the disclosure.
Figure 3A:
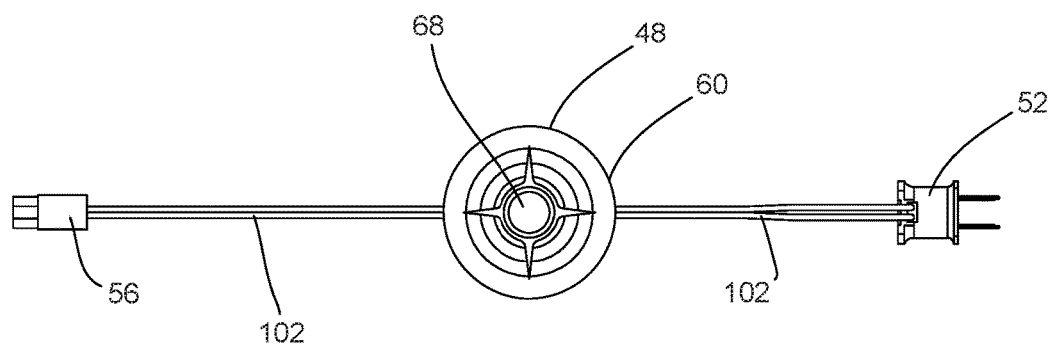
Figure 3B:
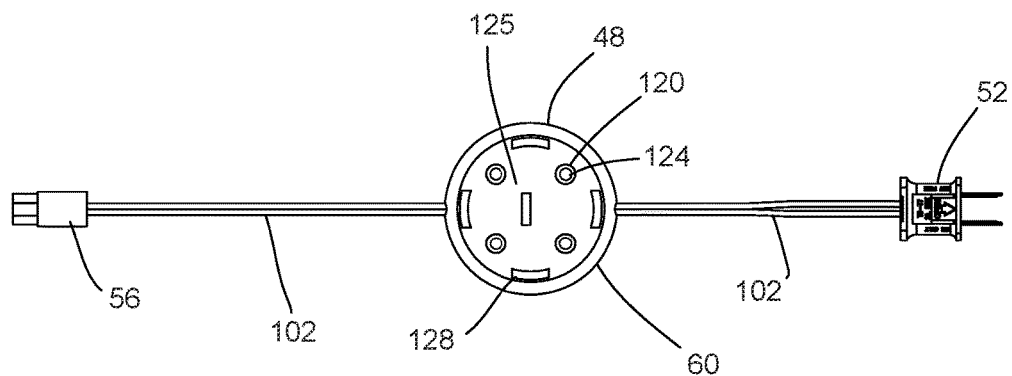

Referring to FIG. 2 an exploded view of the trunk portion 24 and the one or more lighting assemblies 44 is depicted, according to one or more embodiments of the disclosure. As described above, in various embodiments the trunk portion 24 includes one or more sub-portions 36. In certain embodiments, each of the sub-portions 36 include one or more trunk connector portions 80 for connecting the sub-portions 36 together to one or more adjacent sub-portions 36. In some embodiments, each of the sub portions 36 include a light assembly connector 82 for connection to a light assembly 44, and a wiring assembly 84 providing an electrical path between each of the trunk connector portions 80 and the light assembly connector 82. Further embodiments of tree powering systems are described in U.S. Pat. No. 8,454,186, Modular Lighted Tree with Trunk Electrical Connectors, issued Jun. 4, 2013, which is herein incorporated by reference in its entirety.

In certain embodiments, the bottom-most sub-portion 36 includes the controller connector 64 for connection to the lighting controller 48 and for access to an external power source. In other embodiments, lighting controller 48 may be connected to a middle or other trunk portion.

In one or more embodiments, the lighting assemblies 44 include a plurality of sub-assemblies 88 and a light-assembly-to-tree trunk connector 92 that are connected together via a wiring assembly 46. In some embodiments, the sub-assemblies 88 are connected together by the wiring assembly 46 in parallel. However, in certain embodiments, each of the sub-assemblies 88 are connected together in serial. In certain embodiments, each of the sub-assemblies 88 include a light string 100 which includes a set of one or more lighting elements 45 connected together in serial. However, in some embodiments, the set of one or more lighting elements 45 are connected in parallel. In various embodiments, the one or more lighting elements 45 are LEDs. However, in some embodiments, the one or more lighting elements 45 may be incandescent lights, or other suitable type of light or lamp. In embodiments, LEDs may be multi-color, multi-chip In one or more embodiments, in assembly, each of the sub-portions 36 may be connected or coupled together with adjacent sub-portions 36 to form the trunk portion 24. As each of the sub-portions 36 are coupled together, the respective trunk connector portions 80 form an electrical path up and down the coupled sub-portions 36 and to each of the light assembly connectors 82. In various embodiments, each of the light assembly connectors 82 are connected in parallel via wiring assembly 84. The artificial tree connectors 92 of the lighting assemblies 44 may be connected to the respective light assembly connectors 82 of each of the sub-portions 36 to form a path from a power source, through the lighting controller 48, and to each lighting element 45 of the lighting assemblies 44.

Referring to FIGS. 3A-3D, the lighting controller 48 for an artificial tree is depicted, according to one or more embodiments of the disclosure. As described above, the lighting controller 48, in various embodiments, includes a power connector 52, an artificial tree connector 56, and a controller housing portion 60. In one or more embodiments the housing portion 60 includes a switch 68 that may be actuated by being pressed or otherwise physically manipulated by a user. For example, if placed on a floor, a user could actuate the switch by using their foot to press down on the switch 68. In various embodiments, the switch 68 is operably coupled with control logic, for configuration of various lighting settings. In certain embodiments, the control logic is located within housing 60. In some embodiments, the control logic is located in various locations, for example, in or at the trunk portion 24 (FIG. 1) of the artificial tree 20, or in other suitable location.

In an embodiment, light controller 48 may comprise primarily, or only, a timer controller that determines and controls the amount of time that light assemblies 44 will be powered on during a particular period of time, such as a 24 hour time period. In such an instance, a period of time for powering the lights on (power-on duration) and in some embodiments powering off (power-off duration) is determined by user input via operation of the switch 68 of the light controller 48, as described further below.

In one or more embodiments, lighting controller 48 includes power cabling 102, connecting the housing portion 60 with the power connector 52 and the artificial tree connector 56. In certain embodiments, the power cabling 102 is constructed using reinforced wire and/or twisted pairs of wire. For example, reinforced wire may assist in preventing damage to power cabling and to the lighting controller 48, due to wear from placement on the floor. For example, in some embodiments the power cabling 102 is constructed reinforced wiring, such as the wiring depicted and described in U.S. Pat. No. 9,140,438, filed Sep. 15, 2014 and entitled "Decorative Lighting with Reinforced Wiring", which is herein incorporated by reference in its entirety. Wiring of wiring assembly 46, in an embodiment, may also comprise reinforced wiring having an internal strengthening member.

In various embodiments, the lighting controller 48 includes a light array 120 including one or more indicator lighting elements 124, such as LEDs, incandescent lights, or other suitable lighting element. The light array 120 may be positioned in various locations in the housing 60. Depicted in FIG. 3A-3D the light array 120 is positioned on a bottom surface 125 of the lighting controller 48. As such, when placed on a surface, such as a floor, the light array 120 and lighting elements 124 are directed downwards, towards the surface. Light directed towards the surface supporting the light controller 48 may then be reflected from the surface and made visible to a user. In certain embodiments, the lighting controller 48 additionally includes supports 128 on the bottom surface 125 which provide space between the light array 120 and the surface on which the lighting controller 48 is placed.

In other embodiments, indicator lighting elements 124 may comprise a portion of lighting assemblies 44, such as one or more lighting elements 45.

In some embodiments, in operation, the control logic functions to control the supply of power through the lighting controller 48 to the one or more lighting assemblies 44 (FIG. 1). By controlling the supply of power, the control logic can configure the lighting assemblies 44 to function according to one or more predetermined lighting functions (e.g. flash, fade, twinkling, solid, blinking) and/or to set or change the color of the lighting elements 45 in the tree. In certain embodiments, the control logic may set or change timer settings for supplying power to the one or more lighting assemblies 44. For example, the control logic may set time periods where the light assembly is on versus when the light assembly is not on. In certain embodiments, the control logic can set brightness levels for the lighting assemblies. For example, the control logic could configure the lighting assemblies to be dim, bright, or super bright.

In various embodiments, the control logic is configured to receive logical inputs via the manual switch 68. In an embodiment, switch 68 may comprise a push-button switch, which may be a momentary switch, which may be a single-pole switch. The logical inputs may be used to select between or cycle through the various lighting functions, colors, and timing functions. In one or more embodiments, a user can physically manipulate the switch 86 in various ways to produce different logical inputs. For example, in some embodiments, the switch 68 can produce logical inputs based on being pressed, released, long pressed (e.g. pressed and held for a set period of time), short pressed (e.g. pressed and released within a set period of time), hard pressed (e.g. pressed with a force meeting or exceeding a force threshold), or soft pressed (e.g. pressed with a force below a force threshold). Each of the various inputs can be associated with a specific logical input that is used by the control logic to set or change the possible configurations for the lighting assemblies.

For example, in some embodiments, the switch 68 could be repeatedly pressed to cycle through various color settings for each of the lighting elements in the lighting assemblies. Further, by pressing and holding the switch 68 for several seconds could adjust brightness. However, in one or more embodiments, the any method of manipulating the switch 68 could correspond to any type of setting in the control logic.

In some embodiments, where the artificial tree has multiple colors and functions, different categories of settings, the lighting controller 68 can have a logical matrix arrangement. For example, the switch 68 could be controlled with hard press or long press to select one of functions, e.g., flash, fade, twinkle, and second short or light pushes chooses one of the selectable colors. In some embodiments, the switch 68 could be controlled with hard presses or long presses to select a category, for example, to cycle between lighting functions or colors, with short presses or soft presses to choose one of the selected category. In various embodiments, various types of button combinations may be made to select the various configurations of settings.

In an embodiment, a timer function relying on a foot pedal or momentary push-button switch, having a timing memory may be included. Controller 48 may be configured to "remember" the timer function, or power-on/power-off durations, after the tree is powered off. Typically, non-momentary multi-pole timer selector switches are used to implement timing functions, rather than single-pole momentary push-button switches because the switch settings are physically maintained, even when power to the controller 48 or other components is turned off, including when the timer causes power to be turned off. Consequently, when power is turned on, the timer function is known because the timer switch is in the same position it was in when turned off, and hence the same timing function remains, e.g, 3 hours on, 21 hours off. However, because a momentary push-button switch has only two positions, depressed to make or not depressed, when power is turned off, then turned on again, the switch position cannot provide an indication of what timing function previously was selected.

Embodiments of the present invention dynamically monitor and save timer functions, i.e., on/off durations, that are selected by a user using a momentary single-pole push-button switch, so that that same timing function is enabled when power is turned on again after a first on/off cycle, and at the start of a second on/off cycle. In an embodiment, and as often referred to herein, a 24-hour cycle, corresponding to a day, may be implemented, such that power is turned on each day at approximately the same time, then off at approximately the same time each day. In an embodiment, light display or light patterns, other than timing patterns, may be implemented via a momentary push-button switch 68, and saved in memory as described above with respect to timing functions.

In an embodiment, lighting controller 48 may include two switches, including a switch for controlling timing functions, i.e., power-on and power-off combinations, and another switch for controlling light pattern or display functions, e.g., color selection, flashing, twinkling, etc.

In some embodiments, the lighting controller 48 can receive inputs remotely. For example, the lighting controller 48 include a transceiver, using RF, Bluetooth®, or other short range wireless signal, to receive logical inputs from a remote controller.

In certain embodiments, the light array 120 is operably coupled with the control logic to reflect or indicate the various settings set the control logic for the lighting assembly. For example, in some embodiments, the light array 120, using lighting elements 124, visually indicates the settings for the lighting assemblies.

In various embodiments, the light array 120 can display any type of pattern, color, code, or other visual indication, using lighting elements 124, to indicate any setting in the control logic. For example, in some embodiments, the light array 120 indicates color selections for the one or more lighting assemblies by displaying the selected color using the lighting elements 124. In an additional example, the light array 120 could indicate a lighting function (e.g. blinking, twinkling, solid) set in the control logic by mirroring that function in the lighting elements 124. In an embodiment, indicator lights are powered on for an indication duration, such as several seconds; in embodiments, indicator lights are powered on and off multiple times to indicate a function or timer power-on and/or power-off duration. In a further example, the lighting elements 124 could display a code to indicate a timer function setting. For example, one lighting element powered on with three off could mean that the timer is set to 6 hours on and 18 hours off. In some embodiments these codes are predetermined, and a user could compare the indicated code with a chart or a key to determine their meaning.

In another timer embodiment, light array 120 could flash multiple times for a predetermined indication duration, indicating a particular length of time on and off, or power-on and power-off durations. For example, one or more indicator lighting elements 124 may flash, or turn on briefly, once for each hour for power on, e.g., cycling elements 124 one and off twice may correspond to two hours on for the tree lighting assemblies 44 and 22 hours off, or four on-off cycles/flashes of lighting elements 124 may indicate four hours on and 24 hours off. In other embodiments, the number of flashes or on/off sequences may correspond to other lengths of time for powering on and off during a predetermined period of time.

In another embodiment, and as described in part above, lighting elements meant to indicate a particular control function, such as a timer function and specific power-on time, may be part of one or more light strings or lighting assemblies 44. In other words, the lights to be controlled also serve as the indicator lights, including timer duration indicator lights. In one such embodiment, light elements 45 on tree 20 will be turned on and off multiple times to indicate a power-on duration for lighting assemblies 44, in a manner similar to that described above. In one such embodiment, all or a portion of lighting elements 45 may be cycled on and off N times to indicate a power-on duration. The cycling of the lighting elements 45 may be in response to a user operating switch 68. Operation may include a user actuating switch 68 repetitively to cause different durations to be indicated, e.g., push switch 68 once, lights flash twice for two hours, push switch 68 again, lights flash three times for three hours, and so on. In other embodiments, switch 68 may be held in an "on" position, causing indicator lights such as elements 124 or 45, to turn on and off in indicating patterns until switch 68 is released, e.g., holding switch 68 on causes lights to flash two times indicating two hours, followed by a pause, then three times, pause, then four times, etc.

As described above, various types of light displays or patterns may be used to indicate the available control options, including timer options.

Further, it will be understood that "controller" 48, in an embodiment may comprise both a controller for causing a particular light pattern to be displayed, and/or a timer that selectively enables powering of light assemblies 44, which in some embodiments, is independent of the particular light pattern or display that may be available during a power-on time period enabled by the timer.

Referring to FIG. 4, a lighting controller 150 is depicted, according to one or more embodiments of the disclosure. Lighting controller 150 shares one or more like elements with lighting controller 48 (FIGS. 3A-3D). For example, lighting controller 150 includes a power connector 52, an artificial tree connector 56, and a controller housing portion 60. Additionally, lighting controller 150 includes a power cord 154 integrated with the housing 60. In various embodiments, the power cord 154 is connectable to an artificial tree constructed using dual chip LEDs. Power cord 154 may be used to power devices on or related to tree 20, such as an ornament, or additional tree lights, that require AC power. Such an additional cord/outlet 154 may be particularly useful when the primary tree 20 power is DC power meant to power LED-based light elements 45.

Figure 5:
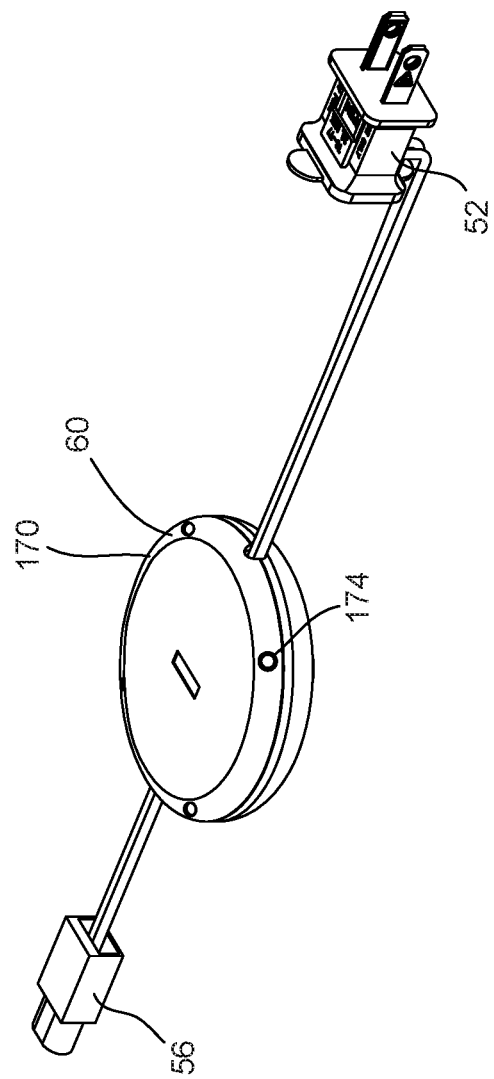
FIG. 5 depicts a bottom perspective view of a lighting control module, according to one or more embodiments of the disclosure.

Referring to FIG. 5, a lighting controller 170 is depicted, according to one or more embodiments of the disclosure. The lighting controller 170 shares one or more like elements with lighting controller 48 (FIGS. 3A-3D). For example, lighting controller 170 includes a power connector 52, an artificial tree connector 56, and a controller housing portion 60. In addition, in one or more embodiments, lighting controller 170 includes light array 174. Light array is positioned along the lateral sides of the housing 60. As described above, the lighting controller 170 may be placed on a surface, such as the floor, and as the light array 174 can indicate the various settings set by the control logic, using lighting elements 178 to display light against the surface, so that they are viewable by a user.

Figure 6:
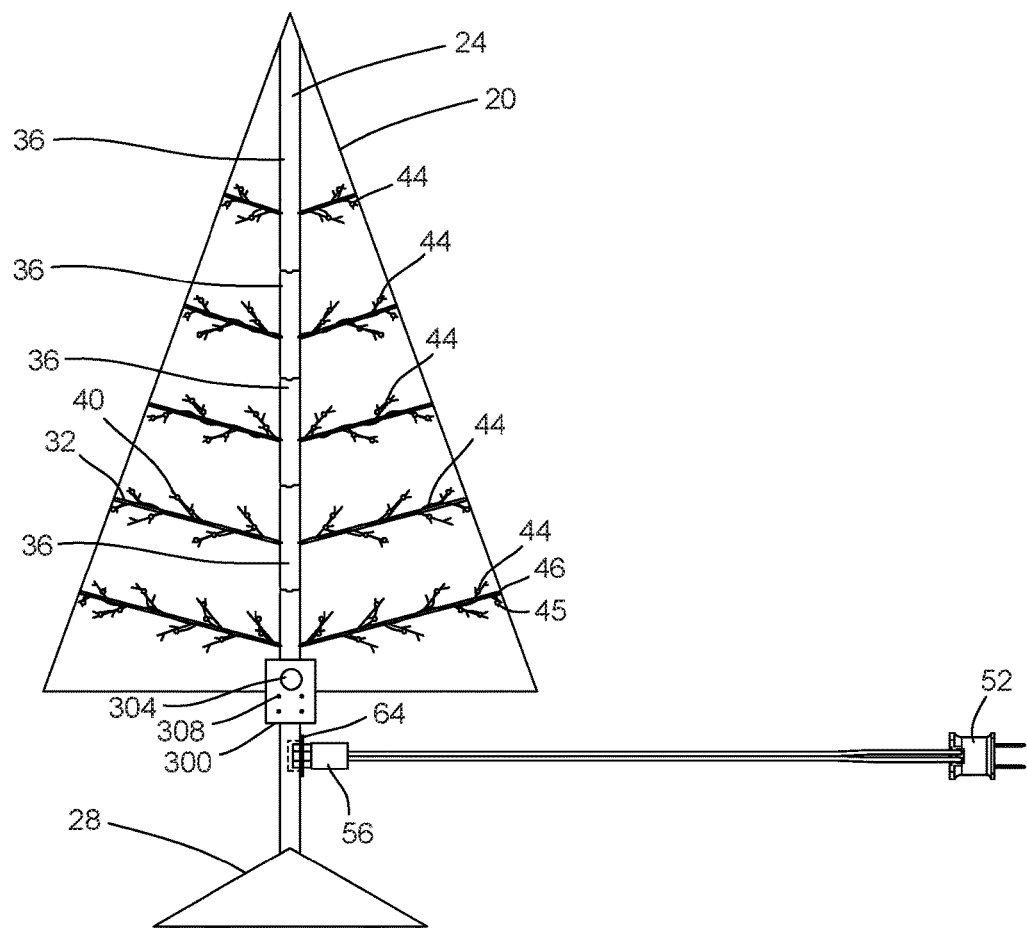
FIG. 6 depicts an artificial tree with a lighting control box, according to one or more embodiments of the disclosure.

Referring to FIG. 6, in some embodiments, the lighting controller 48 (FIG. 1) is implemented in the artificial tree 20 as a controller box 300 with push button 304. The controller box 300 may be located in various positions in the artificial tree 20. Depicted in FIG. 6, the controller box 300 is attached to the trunk portion 24 of the artificial tree 20. In one or more embodiments, the controller box 300 includes a light array 308 substantially similar to light array 120 as described above. Similarly, controller box 300 may operate substantially similarly to lighting controller 48 of FIGS. 3A-3C. For example, in one or more embodiments, a user can cycle through or select between various lighting, timing, and color configurations using push button 304. Light array 308 indicates visually the current light assembly 44 configuration of the artificial tree 20 to the user. In certain embodiments, light array 308 is located at least partially within the controller box 308 underneath the push button 304. Thus, in some embodiments, the user can see indicated function via the push button 304.

Figure 7:
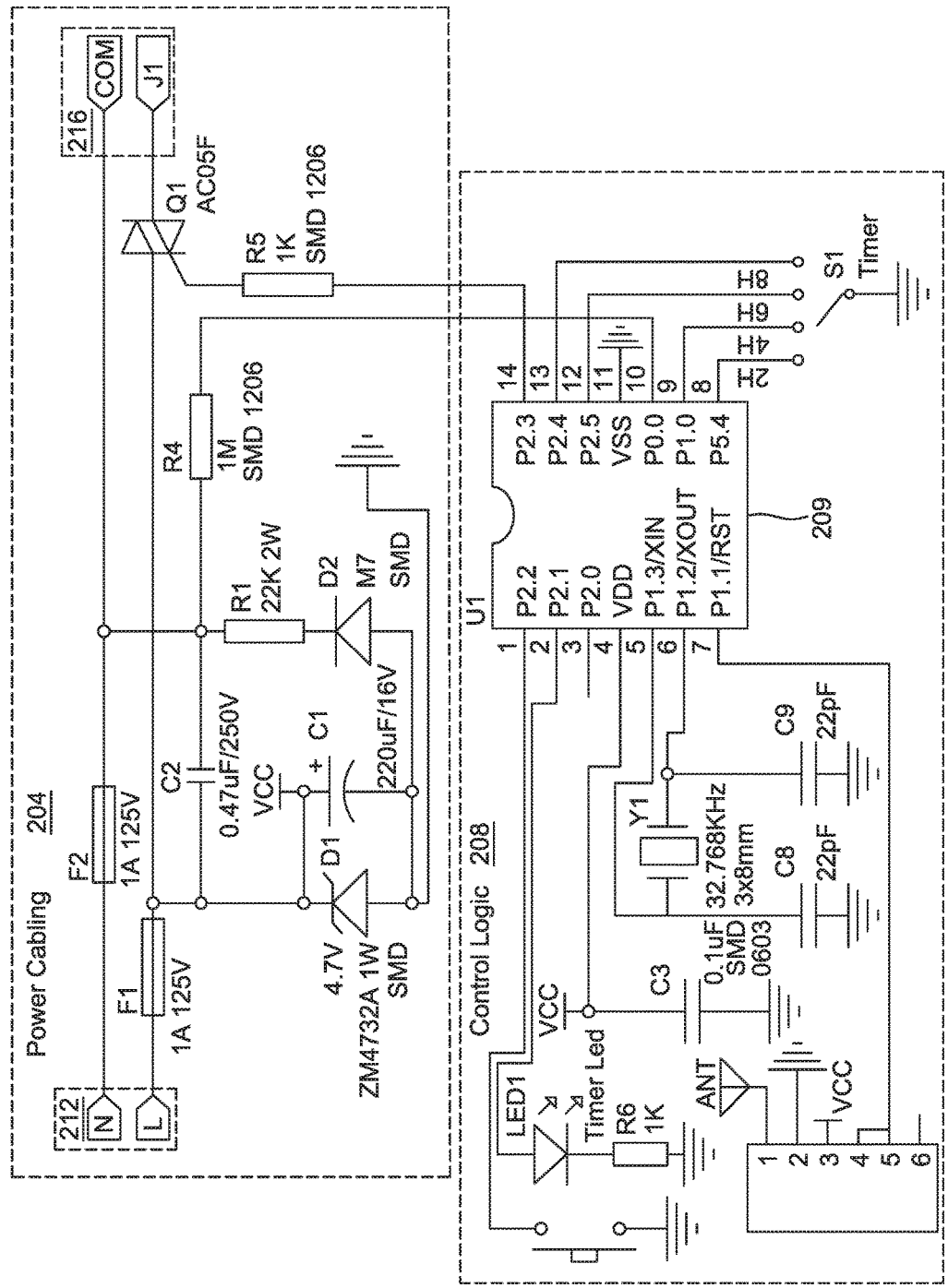
FIG. 7 depicts a system diagram of power cabling and control logic for a lighting controller, according to one or more embodiments of the disclosure.
Figure 8:
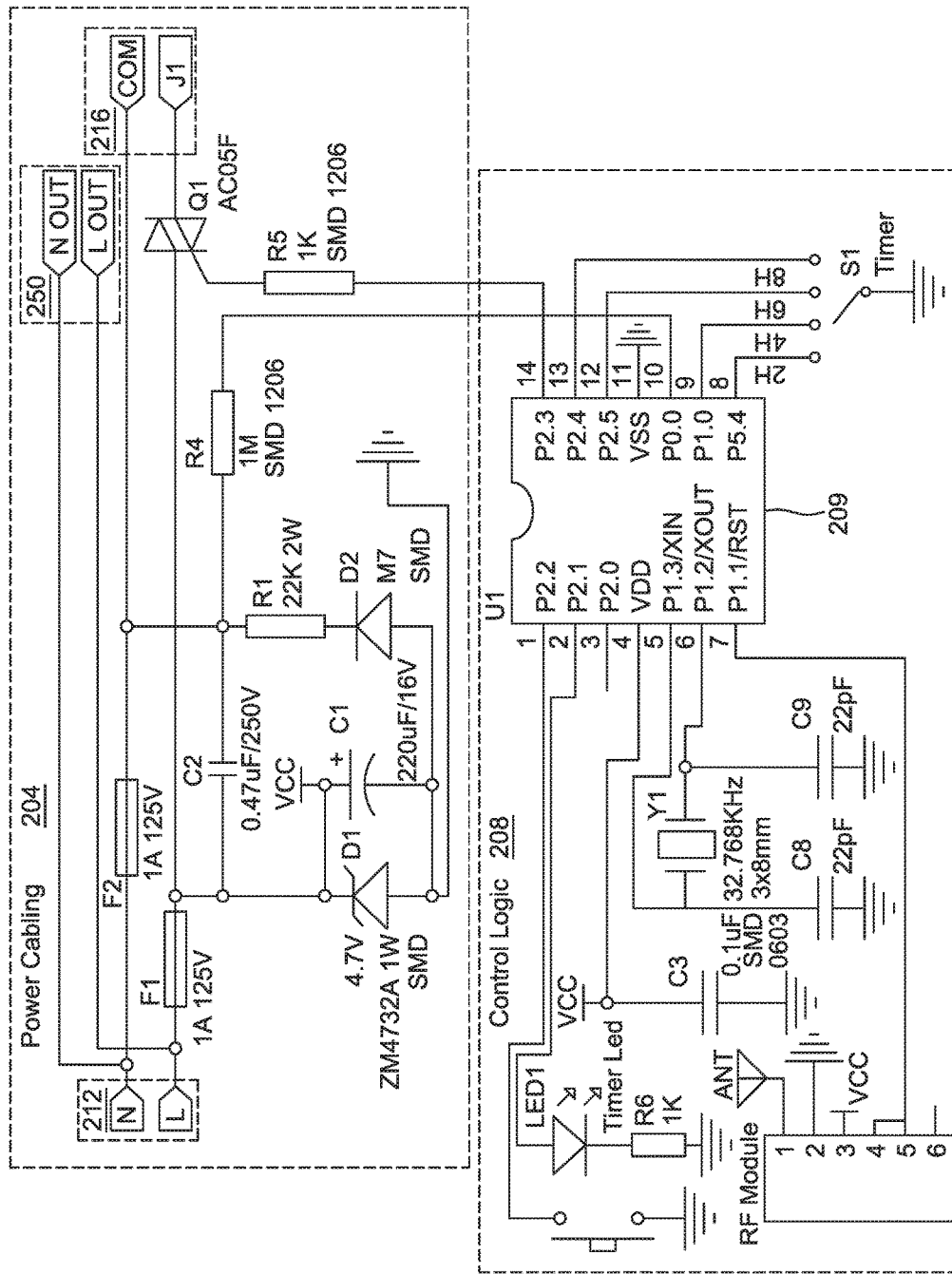
FIG. 8 depicts a system diagram of power cabling and control logic for a lighting controller, according to one or more embodiments of the disclosure.

Referring to FIGS. 7-9, system diagrams of lighting controllers are depicted, according to embodiments of the disclosure. In FIG. 7, the system diagram 200 includes power cabling 204 and control logic 208. Power cabling 204 provides access to power from an input 212 (e.g. associated with power connector 52) to the control logic 208 and to a power output 216 (e.g. associated with the lighting assemblies 44). Depicted in FIG. 7, control logic 208, includes a processor 209 which is communicatively coupled with a timer circuit, indicator LED(s) and remote controller for control and indication of the various lighting settings. In an embodiment, processor 209 may include memory storing instructions to be implemented, or may be in communication with other memory storage of controller 48. Referring to FIG. 8, in one or more embodiments, the power cabling 204 additionally includes a secondary output 250 (e.g. associated with power cord 154 (FIG. 4)).

Figure 9A:
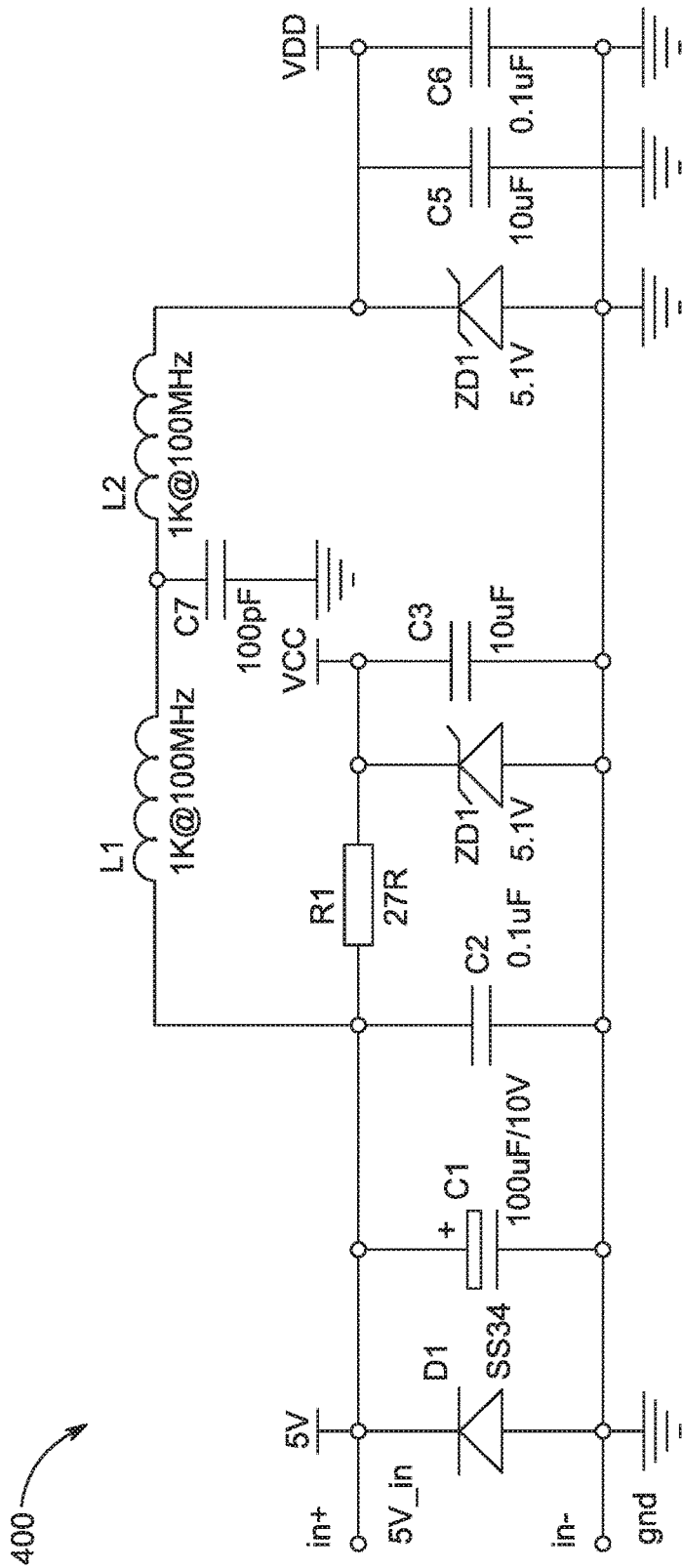
FIG. 9A depicts a power-conditioning circuit for a lighting controller, according to one or more embodiments of the disclosure.

Referring to FIG. 9A a power conditioning circuit 400 is depicted, according to one or more embodiments of the disclosure. In various embodiments the lighting controller may include a transformer for converting the power source to a 5V 4 A power source.

Figure 9B:
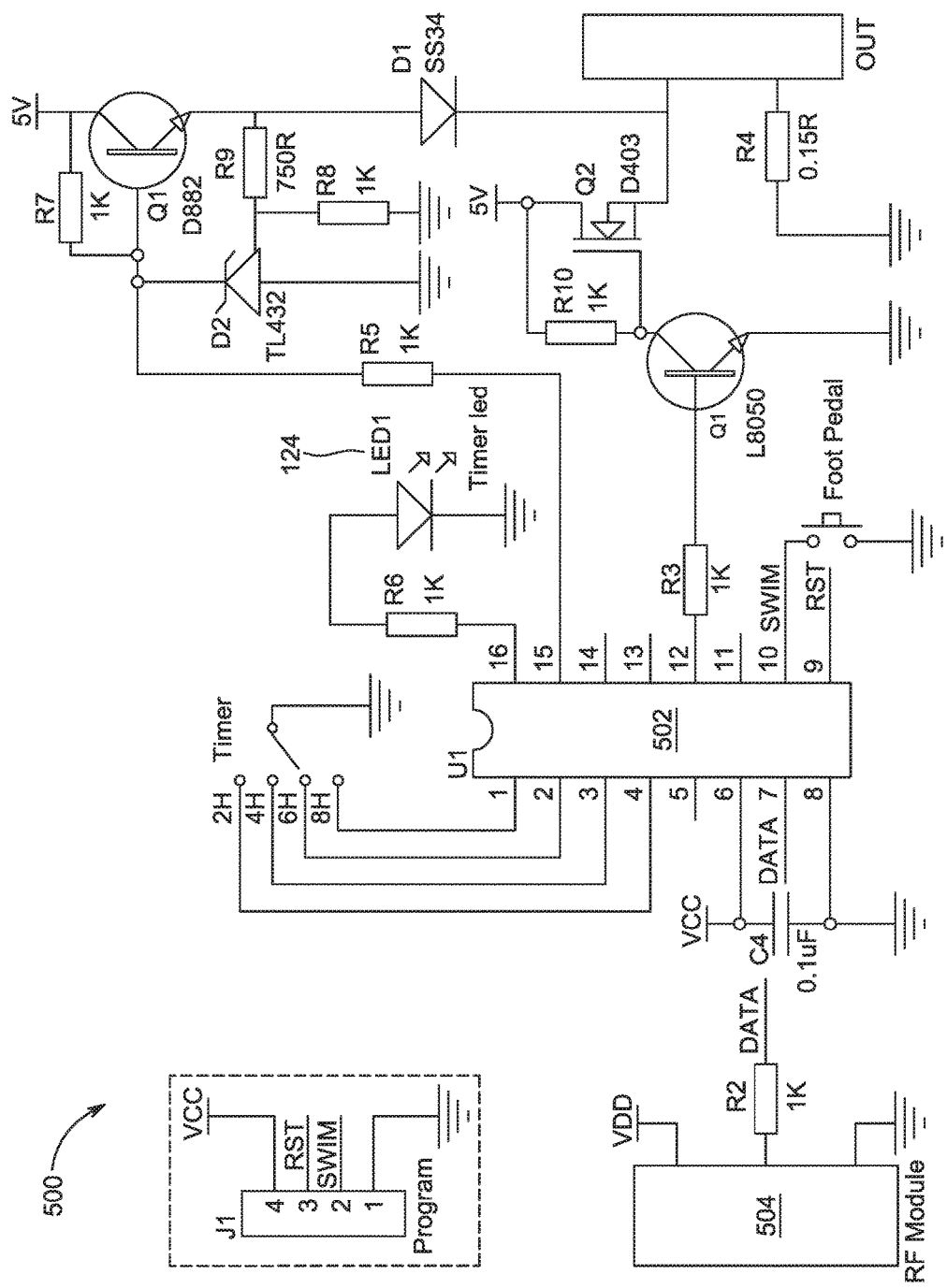
FIG. 9B depicts a system diagram of control logic for a lighting controller, according to one or more embodiments of the disclosure.

Referring to FIG. 9B, another embodiment of a control circuit 500 is depicted, according to one or more embodiments. The control logic 500 includes a processor 502 which is communicatively coupled with a timer circuit, indicator LED(s) and remote controller 504 for control and indication of the various lighting settings.

Although particular circuit diagrams are provided to illustrate particular devices and methods for implementing certain inventive functions described herein, it will be understood that alternate electronic circuits may be utilized to accomplish the various control functions corresponding control functions described above.

For example, in an embodiment, the control circuit of FIG. 9B may be modified, including through software and algorithms stored in and implemented by processor 503, as would be understood by one of ordinary skill, to implement the timer functions wherein light assemblies 44 are selectively powered on and off to indicate a power on-off duration or other control function, rather than relying on an indicator light element 124 as depicted. Further, although the embodiments of FIGS. 7-9 depict separate push button switches (e.g., foot pedal) and timer switches, it will be understood that push button switches only may be used to implement the timer functions in combination with algorithms implemented by the control logic.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A selectively-controlled lighted artificial tree with visual timing function indication, comprising:
    a tree trunk having a plurality of branches;
    a plurality of lighting assemblies including light elements, the plurality of lighting assemblies distributed about an exterior portion of the plurality of branches;
    a plurality of wires in electrical connection with the plurality of light elements, the plurality of wires for transmitting electrical power to the plurality of light elements and at least partially located on an exterior portion of the plurality of branches;
    a controller in electrical communication with the plurality of lighting assemblies and light elements, the controller including a push-button switch and a logic-control circuit with a processor, the controller configured to selectively cause power to be transmitted to one or more of the plurality of light elements for a power-on duration, and to selectively cause power not to be transmitted to the one or more of the plurality of light elements for a power-off duration, and to cause one or more of the plurality of light elements to selectively be powered on for an indication duration, then powered off, wherein a number of times that the one or more of the plurality of light elements is selectively powered on for an indication duration corresponds to the power-on duration, thereby visually indicating a power-on duration,
    wherein the controller is further configured to selectively power the plurality of lighting assemblies according to a predetermined pattern during the power-on duration, the selective powering of the plurality of lighting assemblies being independent of the selective powering of the one or more of the plurality of light elements indicating the power-on duration.

2. The selectively-controlled lighted artificial tree of claim 1, wherein the controller includes another switch for controlling selection of the predetermined pattern.

3. The selectively-controlled lighted artificial tree of claim 2, wherein the another switch is located in a housing that is separate and distinct from a housing that holds the push-button switch.

4. The selectively-controlled lighted artificial tree of claim 1, wherein the push button switch comprises a momentary, single-pole push-button switch.

5. The selectively-controlled lighted artificial tree of claim 1, wherein the power-on duration is selectable in one-hour increments.

6. The selectively-controlled lighted artificial tree of claim 1, wherein the plurality of light elements consists of all light elements of the lighted artificial tree.

7. A selectively controlled lighted artificial tree with visual timing function indication, comprising:
    a tree trunk having a plurality of branches;
    a plurality of lighting assemblies including light elements, the plurality of lighting assemblies distributed about an exterior portion of the plurality of branches;
    a plurality of wires in electrical connection with the plurality of light elements, the plurality of wires for transmitting electrical power to the plurality of light elements and at least partially located on an exterior portion of the plurality of branches;
    a controller in electrical communication with the plurality of lighting assemblies, the controller including a push-button switch and a logic-control circuit with a processor, the controller configured to selectively cause power to be transmitted to one or more of the plurality of light elements for a power-on duration, and to cause one or more of the plurality of light elements to selectively be powered on and off to provide a visual indication of the power-on duration,
    wherein a number of times that the one or more of the plurality of light elements is selectively powered on for an indication duration corresponds to the power-on duration, thereby visually indicating a power-on duration, and
    wherein the controller is further configured to selectively power the plurality of lighting assemblies according to a predetermined pattern during the power-on duration, the selective powering of the plurality of lighting assemblies being independent of the selective powering of the one or more of the plurality of light elements indicating the power-on duration.

8. The selectively-controlled lighted artificial tree of claim 7, wherein the controller includes another switch for controlling selection of the predetermined pattern.

9. The selectively-controlled lighted artificial tree of claim 8, wherein the another switch is located in a housing that is separate and distinct from a housing that holds the push-button switch.

10. The selectively-controlled lighted artificial tree of claim 7, wherein the push button switch comprises a momentary, single-pole push-button switch.

11. The selectively-controlled lighted artificial tree of claim 7, wherein the power-on duration is selectable in one-hour increments.

12. The selectively-controlled lighted artificial tree of claim 7, wherein the plurality of light elements consists of all light elements of the lighted artificial tree.

13. The selectively-controlled lighted artificial tree of claim 7, wherein the controller is further configured to cause power to the plurality of light elements to be powered off for a power-off duration, the power-off duration being equal to 24 hours less the power-on duration.

14. The selectively-controlled lighted artificial tree of claim 7, wherein at least a portion of the plurality of wires is located inside a portion of the tree trunk, and a portion of the plurality of wires is located outside the portion of the tree trunk and adjacent one or more of the plurality of branches.

15. A selectively controlled lighted artificial tree with visual timing function indication, comprising:
   a tree trunk having a plurality of branches;
   a plurality of lighting assemblies including light elements, the plurality of lighting assemblies distributed about the plurality of branches;
   a plurality of wires in electrical connection with the plurality of light elements, the plurality of wires for transmitting electrical power to the plurality of light elements;
   one or more indicator lights;
   a controller in electrical communication with the plurality of lighting assemblies, the controller including a push-button switch and a logic-control circuit with a processor, the controller configured to selectively cause power to be transmitted to one or more of the plurality of light elements for a power-on duration, and to cause at least one of the one or more indicator lights to selectively be powered on and off to provide a visual indication of the power-on duration,
   wherein the controller is further configured to selectively power the plurality of lighting assemblies according to a predetermined pattern during the power-on duration, the selective powering of the plurality of lighting assemblies being independent of the selective powering of the one or more of the one or more indicator lights indicating the power-on duration.

16. The selectively-controlled lighted artificial tree of claim 15, wherein the push button switch comprises a momentary, single-pole push-button switch.

17. The selectively-controlled lighted artificial tree of claim 15, wherein the power-on duration is selectable in one-hour increments.

18. The selectively-controlled lighted artificial tree of claim 15, wherein the one or more light elements distributed on and about an external portion of the plurality of branches of the lighted artificial tree include the one or more indicator lights, such that the one or more indicator lights are light elements distributed on or about the external portion of the plurality of branches of the lighted artificial tree.

19. The selectively-controlled lighted artificial tree of claim 15, wherein the controller is further configured to cause power to the plurality of light elements to be powered off for a power-off duration, the power-off duration being equal to 24 hours less the power-on duration.

20. The selectively-controlled lighted artificial tree of claim 15, wherein at least a portion of the plurality of wires is located inside a portion of the tree trunk, and a portion of the plurality of wires is located outside the portion of the tree trunk and adjacent one or more of the plurality of branches.

* * * * *